Feb. 19, 1957    J. H. CASTEL    2,782,365
ELECTRICAL LOGGING APPARATUS
Filed April 27, 1950
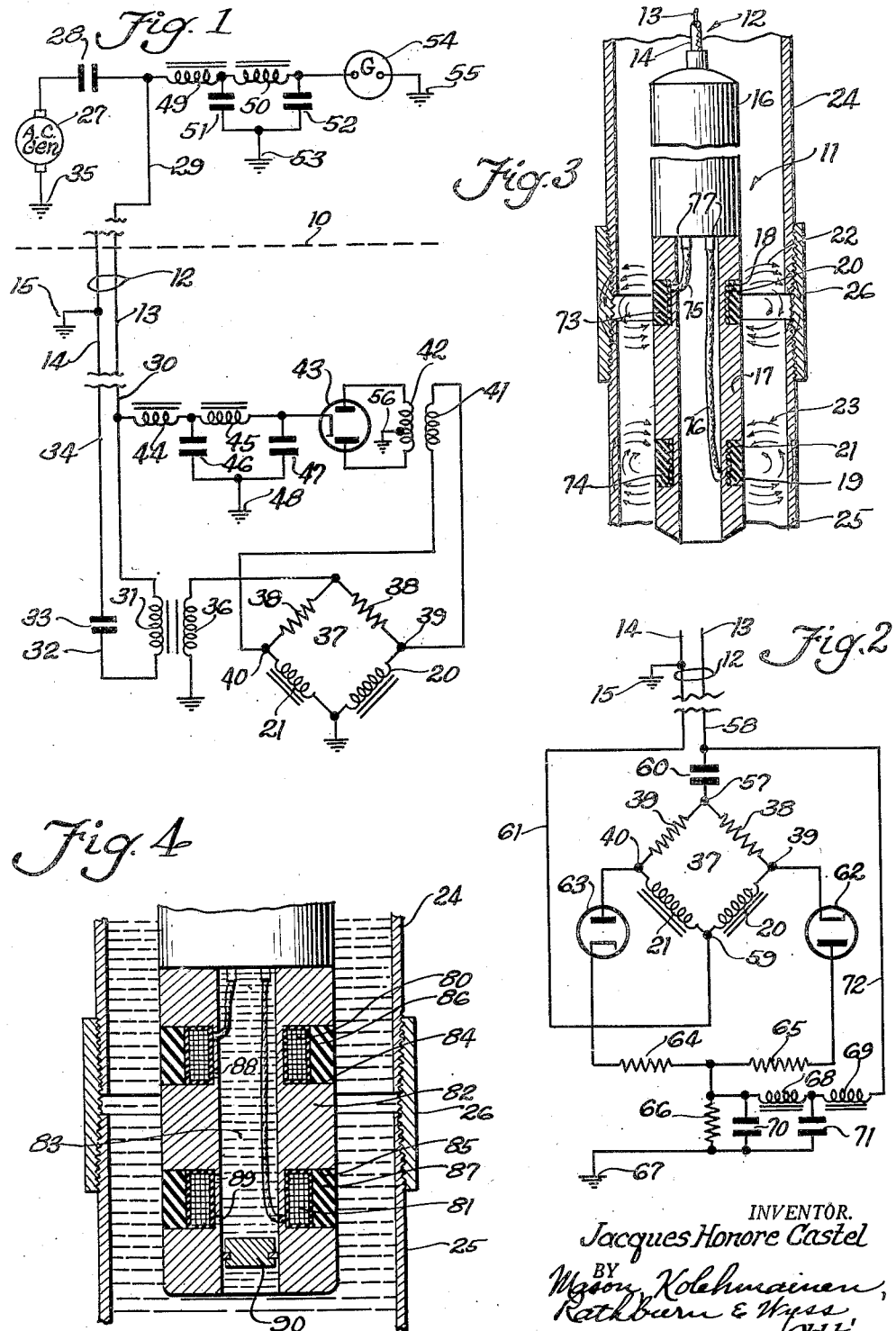
INVENTOR.
Jacques Honore Castel

United States Patent Office 2,782,365
Patented Feb. 19, 1957

2,782,365

ELECTRICAL LOGGING APPARATUS

Jacques H. Castel, Houston, Tex., assignor to Perforating Guns Atlas Corporation, Houston, Tex., a corporation of Delaware Application April 27, 1950, Serial No. 158,576

7 Claims. (Cl. 324—34)

This invention relates to electrical logging methods and apparatus for use in connection with oil wells or similar bore holes, more particularly to collar logging methods and apparatus for cased bore holes; and the invention has for an object the provision of novel and reliable methods and apparatus of this character.

In the drilling and completion of oil wells it is often desirable to have available a record of the locations of the collars on the casing or other hollow metallic member disposed in the bore hole, such as the drill string. Such records can be used as reference or bench marks, and when the depth relation between the casing collars and the various formations traversed by the bore hole is known, the collar log is particularly useful in that completion and work-over processes can be carried out with a high degree of accuracy.

Accordingly, it is a further object of the invention to provide methods and apparatus for readily and accurately obtaining a collar log on a cased well.

In carrying out the invention in one form, changes in the thickness of the casing wall, such as are provided by the casing collars, are detected by measuring the relative changes in the respective impedances in a pair of longitudinally spaced coils or inductance elements which are movable longitudinally through the casing and are energized to produce discrete magnetic fields linking the casing wall. Such impedance changes are due in part to changes in the eddy currents induced in the linked areas of the casing wall, as well as to changes in the reluctance of the magnetic paths of the magnetic fields. Preferably, the inductive elements are energized at high frequencies, at which the eddy current effect is largely predominant in effecting variations in the impedance of the inductive elements, i. e., frequencies in the neighborhood of 400 cycles per second or higher frequencies. In accordance with one embodiment of the invention, the inductive elements are in the form of a pair of coils mounted in fixed coaxially spaced relation on a magnetic core member which is supported on a suitable conducting cable for movement longitudinally of the casing, the arrangement of the coils being such as to substantially eliminate variations in the relative impedance of the individual coils caused by transverse or swinging movement of the cable and the coils in the casing.

For a more complete understanding of the invention, reference should now be had to the drawing, in which:

Fig. 1 is a circuit diagram illustrating the electrical equipment and circuits comprising one form of apparatus embodying the invention, adapted to be employed in carrying out the method of the invention;

Fig. 2 is a circuit diagram showing another embodiment of the down-the-hole portion of the arrangement shown in Fig. 1;

Fig. 3 is a somewhat diagrammatic representation, partially in cross section, of a collar portion of a casing and one form of exploring instrument comprising the down-the-hole equipment shown in Figs. 1 and 2; and Fig. 4 is a view similar to Fig. 3, showing an alternative arrangement embodying the present invention.

Referring now to Figs. 1 and 3 of the drawing, the equipment shown above the broken line 10 in Fig. 1 comprises the equipment located at the surface of the earth, and the equipment shown below the line 10 constitutes the exploring instrument, for example the exploring instrument 11 of Fig. 3, which is supported on a suitable conducting cable 12 comprising a conductor 13 and the usual grounded armor 14. The cable 12, as will be well understood by those skilled in the art, extends into the bore hole and is carried on suitable power operated drums or reels (not shown) located at the surface of the earth, whereby the cable is adapted to be fed out or reeled in so as to move the instrument 11 longitudinally in the bore hole. The cable 12 serves electrically to connect the surface equipment and the down-the-hole equipment comprising the instrument 11, and in Fig. 1 the conductor 13 and the cable armor 14 are represented by similarly identified conductors, the grounded condition of the cable armor 14 being conventionally indicated by the ground connection 15.

As shown in Fig. 3, the exploring instrument 11 comprises an upper housing portion 16, to the lower wall of which is suitably secured a hollow steel mandrel 17, the housing 16 being preferably formed of non-magnetic material. The mandrel 17 is provided, as shown, with a pair of spaced annular grooves 18 and 19, in which are located a pair of windings or coils 20 and 21, respectively, which constitute the inductive elements, the relative impedance of which is measured in accordance with the present invention.

As will be more fully explained hereinafter, the windings 20 and 21 are energized in accordance with the present invention so as to produce discrete magnetic fields represented in Fig. 3 by the two sets of arrows 22 and 23, respectively, which link the casing walls so that the two fields sequentially link successive areas of the casing walls as the exploring instrument 11 is moved longitudinally of the bore hole. In Fig. 3 a collar portion of the well casing is shown comprising a pair of casing lengths 24 and 25 connected in conventional fashion by a collar 26.

Referring now to Fig. 1, the equipment above the surface of the earth includes a suitable alternating current generator 27 adapted to generate alternating currents of high frequency, such, for example, as 400 cycles per second or over, one terminal of the generator 27 being connected through a direct current blocking condenser 28 and a conductor 29 to the conductor 13 of the armored cable 12. The opposite end of the conductor 13 is connected to the equipment within the instrument 11 by means of a conductor 30 which extends to the primary winding 31 of a suitable current transformer, the opposite terminal of which is connected through a conductor 32, a second direct current blocking condenser 33 and a conductor 34 to the grounded cable armor 14, the generator circuit being completed by way of the ground connection 35. Associated with the primary winding 31 of the current transformer is a secondary winding 36, which is connected to energize a Wheatstone bridge circuit 37, which comprises the coils or windings 20 and 21 and a pair of resistor elements 38. The coils 20 and 21 and the resistor elements 38 are so proportioned that normally, when the areas of the casing wall linked by the magnetic fields of the coils 20 and 21 are symmetrical, the bridge 37 is balanced and no voltage appears across the output terminals 39 and 40 thereof.

However, when the instrument 11 occupies a position such as shown in Fig. 3, so that the magnetic field 22 produced by the coil 20 links a wall area including the collar 26 while the magnetic field 23 produced by the coil 21 is beyond the collar 26, the impedance of the coil 20 will be different from that of the coil 21 due largely to the loss produced by the increase in eddy currents in the greater amount of material represented by the collar 26 and the adjacent portions of the casing sections 24 and 25. The difference in the relative impedance of the coils 20 and 21 will produce an unbalance of the bridge 37 and a voltage difference will consequently appear across the output terminals 39 and 40 of the bridge circuit. As shown, these output terminals are connected to the primary winding 41 of a suitable step-up transformer, the secondary winding 42 of which is connected, as shown, to a full wave rectifier 43 so as to produce a direct current voltage indicative of the unbalanced condition of the bridge circuit. The direct current voltage produced by the rectifier 43 is supplied through a suitable low pass filter comprising choke coils 44 and 45, condensers 46 and 47, and a ground connection 48, to the conductor 30, which, as previously indicated, is connected to the conductor 13 of the cable 12, to which the conductor 29 of the surface equipment is likewise connected. From the conductor 29 the direct current voltage is supplied through a second low pass filter consisting of choke coils 49 and 50, condensers 51 and 52, and a suitable ground connection 53, to an indicating instrument, which is shown diagrammatically as constituting a galvanometer 54 but which may constitute any suitable recording or indicating instrument. From the galvanometer 54 the direct current circuit is completed through the ground connections 55 and 56 and the secondary winding 42 to the rectifier tube 43. It will be observed that the blocking condensers 33 and 28 isolate the direct current circuit containing the galvanometer 54 from the high frequency alternating current circuit containing the generator 27. From the foregoing description it will be apparent that, as the exploring instrument 11 is moved longitudinally through the bore hole casing, the galvanometer or indicating instrument 54 will be energized to indicate the location of the casing collars as the spaced discrete magnetic fields 22 and 23 sequentially link the collar areas. The energization of the coils 20 and 21 is such that the magnetic fields 22 and 23 are in opposition, as indicated by the arrows in Fig. 3, so that short circuiting of the two fields and coupling of the coils 20 and 21 through the magnetic mandrel 17 is prevented.

In the embodiment of the invention shown in Fig. 2, the equipment located at the surface of the earth is identical with the equipment shown in Fig. 1, but in this case one input terminal 57 of the bridge circuit 37 is connected through a blocking condenser 60 and a conductor 58 to the conductor 13 of the cable 12 and the other input terminal 59 of the bridge circuit 37 is connected through a conductor 61 to the grounded cable armor 14 so that the bridge 37 is directly in series circuit relation with the generator 27, the current transformer comprising the windings 31 and 36 of Fig. 1 thus being eliminated. In this embodiment of the invention, a plurality of oppositely poled rectifier tubes 62 and 63 are connected to the output terminals 39 and 40 of the bridge 37, and are connected to ground through a pair of resistors 64 and 65 and a common resistor 66, the ground connection being indicated at 67. Thus the voltage appearing across the coils 20 and 21 at any time is rectified and the direct current produced from each of the coils flows through the common resistor 66. Since the rectifiers 62 and 63 are connected in opposite polarity, the effective D. C. voltage drop appearing across the resistor 66 is zero when the impedances of the coils 20 and 21 are equal. Any unbalance of the bridge circuit 37, however, will cause a D. C. voltage to appear across the resistor 66, which voltage is supplied to the conductor 13 of the armored cable 12 through the low pass filter comprising the choke coils 68 and 69 and the condensers 70 and 71, by way of the conductors 72 and 58. This direct current voltage is supplied to the indicating element of galvanometer 54 of Fig. 1, as previously described, so as to provide at the surface equipment a positive and accurate indication of any unbalance of the bridge circuit 37 caused by a change in the relative impedance of the coils 20 and 21.

In the instrument 11 shown in Fig. 3, the coils 20 and 21 are shown as constituting single layer coils which are wound in the grooves 18 and 19 and suitably insulated from the steel mandrel 17. When employing the current transformer comprising the windings 31 and 36 of Fig. 1, sufficiently high currents can be obtained so that only a few turns of wire are necessary on the coils 20 and 21 to establish a magnetic field of sufficient strength for measuring purposes, and accordingly the single layer coils may be employed, thereby eliminating the problem of crushing action between layers, which may be encountered due to the excessive hydrostatic pressures encountered in deep oil wells. Preferably the single layer coils 20 and 21, as shown in Fig. 3, are embedded in suitable rubber insulation 73 and 74, and the leads from the coils extend into the hollow center of the mandrel 17, and these leads, such, for example, as the conductors 75 and 76, extend into the housing portion 16 of the instrument 11 through high pressure insulating bushings 77, it being understood that all of the down-the-hole equipment, with the exception of the coils 20 and 21 is located within the housing 16.

In some cases, such, for example, as when employing the down-the-hole equipment of Fig. 2, in which the step-up current transformer is eliminated, insufficient energy may be available to provide magnetic fields of desirable magnitudes with the low impedance single layer coils of Fig. 3. In Fig. 4 a construction is shown embodying multiple layer high impedance coils 80 and 81 and provision is made to prevent crushing of the coils which would otherwise occur due to the large hydrostatic pressures encountered in deep bore holes. As shown in Fig. 4, a steel mandrel 82 having a central hollow portion 83, which is open at the bottom, is provided with spaced apart grooves 84 and 85 for receiving the multiple layer coils 80 and 81. Suitable molded rubber coverings 86 and 87 are provided in the grooves 84 and 85 for protecting the coils 80 and 81 from the bore hole fluid, and the grooves 84 and 85 are connected by suitable apertures 88 and 89 with the central opening 83 in the mandrel 82, which is filled with a suitable insulating material having proper electrical characteristics. The insulating fluid contained in the central aperture 83 is isolated from the bore hole fluid by a floating piston 90 which is free to move longitudinally of the reservoir 83 so as to equalize the internal and external pressures. The insulating fluid contained in the central reservoir 83 permeates the coils 80 and 81, and the equalization of pressure effected by movements of the piston 90 is effective to protect the coils against crushing.

It will thus be apparent that the present invention provides a simple and reliable method for collar logging the cased bore hole, together with inexpensive and rugged apparatus and exploring instruments which may be constructed from inexpensive and readily available parts. By employing a pair of spaced coaxially positioned coils, all improper indications caused by transverse or swinging movement of the instrument in the casing are eliminated, since variations in the impedance of the coils which would give false indications if only one coil were employed are eliminated due to the fact that transverse movement affects the two spaced coils equally and consequently does not produce a relative change in the impedance.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed and desired to be secured by Letters Patent is:

1. Apparatus for logging bore hole casings comprising, a pair of inductive elements, housing means for supporting said inductive elements within a casing for movement longitudinally thereof including a conducting cable for conducting currents between said elements and a point of observation outside said bore hole, means including one conductor of said cable for energizing said elements to produce discrete magnetic fields linking the wall of said casing, means disposed within said housing connected in circuit with said elements to form a balanceable bridge, rectifying means disposed within said housing energizable from said bridge to produce a direct current indicative of the relative balance of said bridge, and measuring means at said observation point energizable through said one conductor by said direct current.

2. In a logging apparatus, a high frequency electromagnetic exploring element comprising, an elongate body of magnetizable material, said body having a pair of longitudinally spaced annular grooves therein, a single layer winding disposed in each of said grooves, insulating material embedding said windings and substantially filling said grooves outwardly of said windings, and means for energizing said windings to produce a pair of discrete longitudinally spaced magnetic fields surrounding said body.

3. In a logging apparatus, a housing formed of nonmagnetic material, a cable secured to one end of said housing for supporting said housing for movement longitudinally in a bore hole, an elongate body of magnetizable material carried by and extending longitudinally from the other end of said housing, a pair of windings supported on said body in longitudinally spaced relation, means in said housing connected in circuit with said windings to form a balanceable network, means including said network for energizing said windings from one conductor of said cable to produce a pair of longitudinally spaced discrete magnetic fields surrounding said body, means in said housing including said network for producing a direct current voltage indicative of changes in the relative impedances of said windings, and low pass filter means for supplying said direct current voltage to said one conductor.

4. Apparatus for logging bore hole casings comprising, a pair of inductive elements, means for supporting said elements in spaced fixed relation to each other, means including a flexible cable for moving said elements longitudinally of said casing, means including said cable for energizing said elements at a frequency in the neighborhood of 400 cycles per second to produce discrete high frequency magnetic fields linking longitudinally spaced areas of said casing wall to produce eddy currents therein, means interconnecting said elements for producing a differential voltage proportional to the relative impedances of said elements, rectifier means energizable by said differential voltage for developing a direct current voltage indicative of changes in said relative impedances, and means for measuring said direct current voltage to indicate positions of unsymmetrical casing areas along said bore hole.

5. In a logging apparatus, a high frequency electromagnetic exploring instrument comprising, a housing, an elongate body of magnetizable material carried by said housing, said body having a pair of longitudinally spaced annular grooves therein, a single layer winding disposed in each of said grooves, insulating material disposed in said grooves outwardly of said windings and embedding said windings, means in said housing connected in circuit with said windings to form a balanceable network, means including said network for energizing said windings to produce a pair of longitudinally spaced discrete magnetic fields surrounding said body, and means in said housing for producing an electric force related to the balanced or unbalanced condition of said network.

6. In a logging apparatus, a high frequency electromagnetic exploring instrument comprising, a housing, an elongate body of magnetizable material carried by said housing, said body having a pair of longitudinally spaced annular grooves therein, a single layer winding disposed in each of said grooves, insulating material disposed in said grooves outwardly of said windings and embedding said windings, means in said housing connected in circuit with said network for energizing said windings to produce a pair of longitudinally spaced discrete magnetic fields surrounding said body, and means in said housing including said network for producing a direct current voltage indicative of changes in the relative impedances of said windings.

7. In a logging apparatus, a high frequency electromagnetic exploring instrument comprising, a housing, an elongate body of magnetizable material carried by said housing, said body having a pair of longitudinally spaced annular grooves therein, a single layer winding disposed in each of said grooves, insulating material disposed in said grooves outwardly of said windings and embedding said windings, and means including voltage transformer means in said housing for energizing said single layer windings to produce a pair of discrete longitudinally spaced magnetic fields surrounding said body.

References Cited in the file of this patent

UNITED STATES PATENTS

| Re. 21,003 | Knerr et al. | Feb. 14, 1939 |
| 2,104,646 | Greenslade | Jan. 4, 1938 |
| 2,154,156 | Turner et al. | Apr. 11, 1939 |
| 2,194,229 | Johnston et al. | Mar. 19, 1940 |
| 2,250,703 | Crites et al. | July 29, 1941 |
| 2,357,178 | Doll | Aug. 29, 1944 |
| 2,398,761 | Aiken | Apr. 23, 1946 |
| 2,470,828 | Millington et al. | May 24, 1949 |
| 2,501,953 | Martin | Mar. 28, 1950 |
| 2,508,494 | Cook et al. | May 23, 1950 |
| 2,540,588 | Long | Feb. 6, 1951 |
| 2,540,589 | Long | Feb. 6, 1951 |

FOREIGN PATENTS

| 389,330 | Great Britain | Mar. 16, 1933 |
| 664,814 | France | Apr. 29, 1929 |